United States Patent

[11] 3,616,013

[72] Inventor Luigi Bocchi
 Via. priv. Rep. S. Marino, Milan, 6, Italy
[21] Appl. No. 762,572
[22] Filed Sept. 25, 1968
[45] Patented Oct. 26, 1971
[32] Priority Sept. 25, 1967
[33] Italy
[31] 20866A/67

[54] PROCESS FOR MAKING SHAPED ARTICLES FROM CLOTH AND THERMOPLASTIC MATERIAL
1 Claim, 4 Drawing Figs.

[52] U.S. Cl. .................................................. 156/224,
 156/285, 156/499
[51] Int. Cl. ..................................................... B31j 1/00
[50] Field of Search........................................... 156/224,
 196, 198, 285

[56] References Cited
UNITED STATES PATENTS

| | | | |
|---|---|---|---|
| 2,513,052 | 6/1950 | Roberts........................ | 156/196 X |
| 3,039,911 | 6/1962 | Fox .............................. | 156/224 |
| 3,446,686 | 5/1969 | Butler et al.................. | 156/224 |
| 3,322,601 | 5/1967 | Wong et al................... | 156/224 X |

Primary Examiner—Samuel W. Engle
Attorneys—W. W. Portz and Irvin L. Groh

ABSTRACT: A process for forming composite plastic and fabric articles to a desired shape wherein a sheet of thermoplastic material and a stretchable fabric are separately supported in spaced generally parallel planes over a forming surface with the fabric closer than the sheet to the forming surface. The sheet is heated to a pliable state and forced toward the molding surface to carry the fabric as well as the sheet into conforming relation with the mold surface. The resulting shaped object is chilled in the mold into a rigid condition under which it may be removed and trimmed or vice versa.

INVENTOR
LUIGI BOCCHI

PROCESS FOR MAKING SHAPED ARTICLES FROM CLOTH AND THERMOPLASTIC MATERIAL

In the field of molding shaped objects for use in packaging, one known process is practiced in two stages wherein a thermoplastic sheet material is heated to the melting point and applied to a cloth as a coating. Then the coated cloth is pressed within a die and molded. Other methods include assembling dissimilar sheet materials including one or more sheets of potentially adhesive material into a laminate and then subjecting the laminate to heat and pressure to shape it into an article of desired contour.

A major object of this invention is to provide a simple single-step process for forming articles of fabric or cloth and a thermoplastic material, such as polyethylene, in a rapid manner.

Another object is to establish a process by which thermoplastic sheet and cloth materials may be shaped instantly to rigid, deeply drawn configurations.

A further object is to provide a process of forming articles of plastic material and cloth or fabric wherein a deeply drawn fabric is permitted to slip relative to a holding means for the fabric as well as to stretch while being forced into conformity with a mold by a heat-softened thermoplastic material reacting to mechanical or fluid pressure.

The invention resides in a process wherein a sheet of thermoplastic material is heated to a stage of softness and tackiness at which it will have a tendency to adhere to a sheet of cloth or fabric which is therefore inherently gas pervious and is by nature elastic and stretchable, e.g., of textile net or knitted fabric construction. The sheets of heated plastic and fabric are arranged in generally parallel planes opposite a form or mold which may be of either positive or negative contour. Portions of the sheet or fabric in superimposed relation with the mold are supported substantially continuously along the peripheries of such portions enabling an external force to act on the thermoplastic sheet portion to force it against the cloth and into complete envelopment of, and conformity with, the shaping surface of the mold. After shaping, the composite fabric and resinous article is chilled to a condition of rigidity wherein it will maintain its shape. For example, the mold is maintained at a temperature which immediately chills the now united and shaped thermoplastic and fabric portions to a rigid condition.

In the drawing with respect to which the invention is described:

Figure 1:
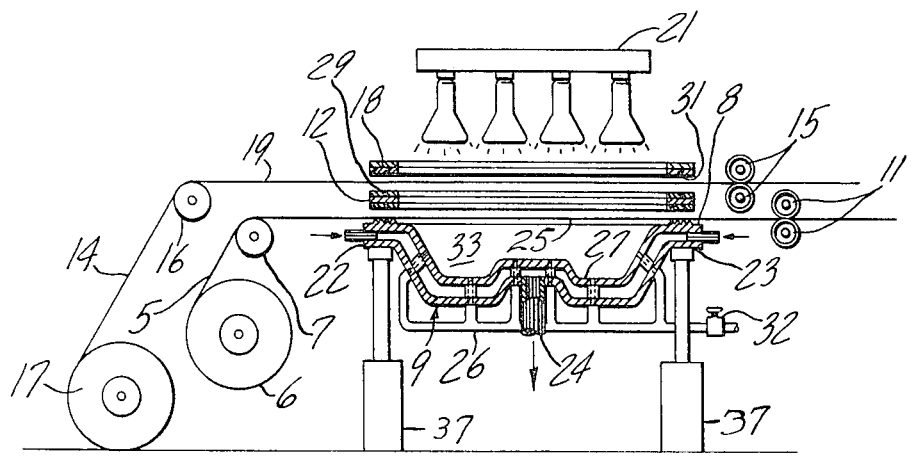
FIG. 1 is a schematic elevation with parts in section showing a molding apparatus for performing the process in accordance with the invention.
Figure 2:
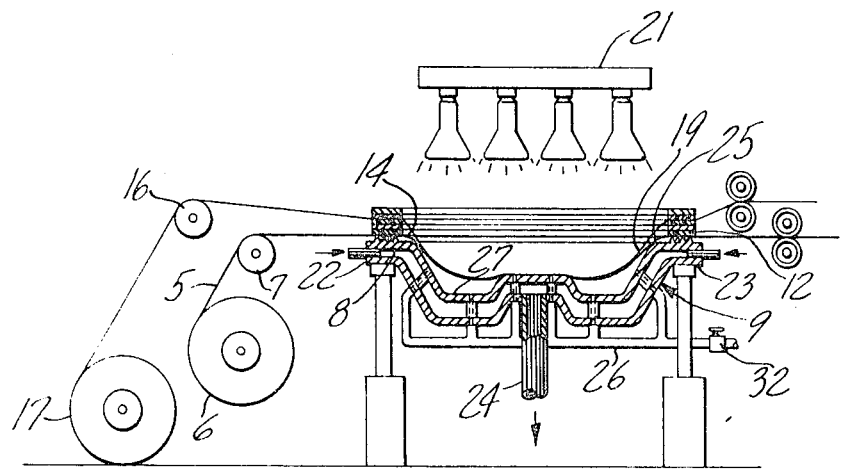
FIG. 2 is a schematic elevation with parts in section of the apparatus of FIG. 1 illustrating an intermediate stage of shaping a molded article.

The process may be carried out, for example, as shown in FIGS. 1 and 2, wherein a stretchable gas pervious fabric 5 is drawn from a supply roll 6 thereof over a support roll 7 and over the peripheral lip 8 of a mold 9 by a pair of advancing rolls 11. A vertical movable frame 12 may be spaced above the mold, as shown, to permit horizontal movement of the cloth 5 between the frame 12 and the lip 8. Slightly above the frame 12, a portion of thermoplastic sheet 14 stands along its horizontal path of movement as established by a pair of advancing rolls 15 and a support roll 16 in unwinding from a supply roll 17. In the opened condition of the apparatus, another vertically movable holding frame 18 is positioned above the horizontal portion 19 of the thermoplastic sheet 14. At a still higher position, a heater 21 is supported centrally over the frame 18 to soften and tackify portion 19 of the sheet 14 within the frame 18.

As the mold is used to rigidify heated thermoplastic materials by cooling, the mold is of hollow or jacketed construction to enable passage therethrough of a coolant, e.g., from inlets 22 and 23 to an outlet 24. The coolant may be circulated continuously through the mold if desired.

FIG. 2 illustrates the apparatus of FIG. 1 in the act of drawing the heated portion 19 of the sheet 14 into contact with the underlying portion 25 of the fabric 5. Movement of the plastic sheet and fabric portions is effected by vacuum exerted through a manifold 26 having various openings along the mold surface 27. In this condition of the molding apparatus, the fabric 5 is tightly confined between the upper lip 8 of the mold and the frame 12.

Sealing of the molding region to obtain vacuum conditions is enhanced by a plurality of continuous peripheral ridges forming an upper surface of the lip 8 of corrugated cross section for engagement with the resilient undersurface of 12 provided by means, such as a rubber gasket. Sufficient downward pressure on the frame 12 to cause substantial conformity of the undersurface of the gasket 28 and the fabric 5 with the corrugated surface establishes a somewhat imperfect but wholly adequate seal between the engaged lip and frame 12 during operation.

To complete formation of a vacuum chamber, the frame 18 is lowered to tightly engage portion 19 of the sheet 14 to dispose it in sealed sandwiched relation with an upper resilient surface 29 of the frame 12 and a resilient undersurface 31 of the frame 18. At this juncture, a quick-opening valve 32 connected with a vacuum generator not shown may be opened to instantly exhaust the region 33 enclosed by plastic portion 19 and molding surface 27. In effect, the plastic portion 19 and the fabric portion 25 are carried against the chilled molding surface 27 and instantly rigidified. Depending on the difference of pressure on opposite sides of the thermoplastic material being deflected, the tacky thermoplastic material of the sheet portion 19 may be forced to some extent into the interstices of the fabric portion 25 at the instant of shaping to the surface 27. The substantially rigid article 35 thereby formed may be trimmed out of the sheet 14 and the fabric 5 along, e.g., dotted line 36 by manual or mechanical means not shown. The article 35 may be released from the mold by lowering the mold away from the molding region by means such as the hydraulic jacks 37 shown or by elevating the frames 12 and 18 to positions substantially above the molding region providing at least the sheet 14 is trimmed exteriorly of the frame 18.

Figure 4:
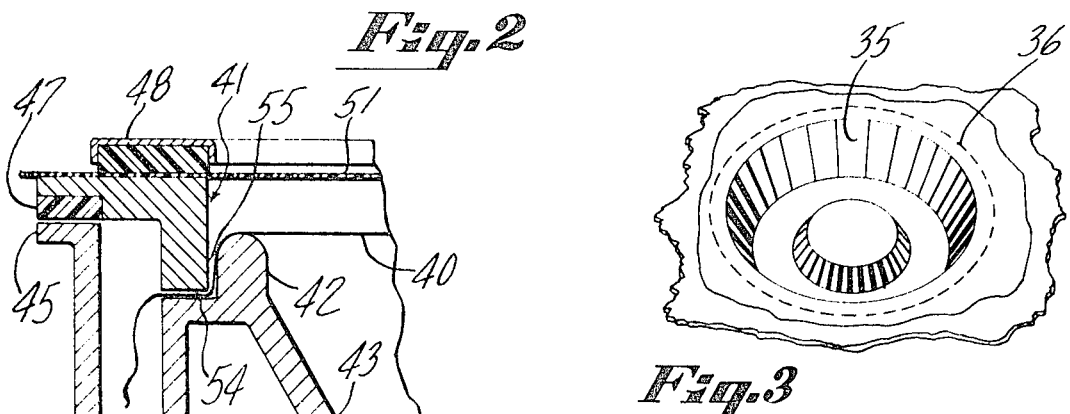
FIG. 4 is a fragmentary elevation in section of a modified molding apparatus.
Figure 3:
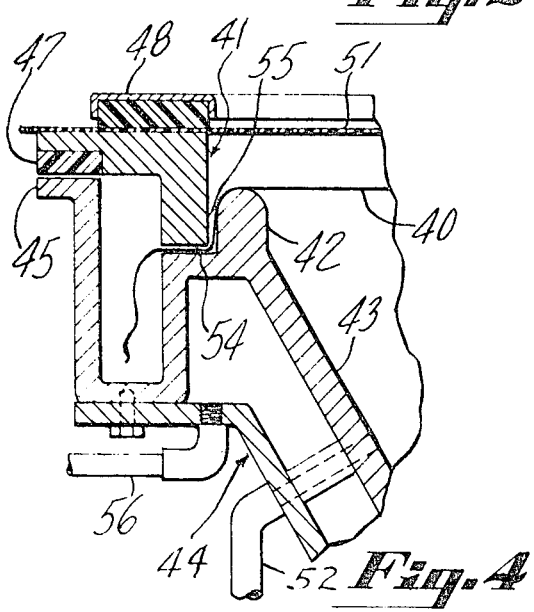
FIG. 3 is a fragmentary perspective view of an untrimmed article made in accordance with the process herein described.

FIG. 4 illustrates method and apparatus for forming an article, such as the article 35, whereby a piece of cloth 40 is initially confined by a frame 41 in taut condition over a flange 42 defining an upper extremity of the molding surface 43 of the mold 44. The frame 41 is supported on an upper flanged surface 45 and is provided with means, such as a gasket 47, to establish sealed relationship with the mold. A frame 48 tightly engages the thermoplastic sheet 14 to confine a portion 51 thereof over the mold cavity and the underlying portion of the cloth 40. With sheet portion 51 in a tacky thermoplastic condition, vacuum may be applied to the mold interior through a manifold (similar to manifold 26) of which duct 52 is a portion to accomplish shaping of the sheet and cloth portions into a united shaped structure somewhat as described with respect to the method described with respect to FIGS. 1 and 2. The essential difference is that in the present shaping operation, the cloth portion is permitted to slip between the opposed adjacent surfaces of the mold 44 and the frame 41. The frame 41, as shown by FIG. 4, is constructed to engage the mold flange 45 as a seat. The undersurface 54 and radial inner surface 55 have a predetermined clearance with the corresponding opposing surfaces of the mold. The clearance between the under surface 54 and the opposing upward facing surface of the mold may be adjusted to some degree by yielding of the gasket 47 in response to pressure exerted on the frame 48 during the molding operation. Hence, this invention contemplates slipping of the cloth portion 40 along its areas of initial support as well as stretching during deformation thereof from engagement of the swelling thermoplastic portion 51 as it reacts to a difference in pressure on its opposite sides, e.g., by vacuum exerted on the manifold portion 52. As shown, the mold has an inlet 56 for admitting a coolant within the liquid jacket of the mold in a manner described for mold 9.

The foregoing describes a potentially rapid process facilitated by the very rapid heating of the thermoplastic sheet that can be accomplished by reason of its being separated from the fabric just prior to the application of vacuum forces. While vacuum is a preferred mode of conforming the materials to the molding surfaces 27 and 43, such conformity may be achieved by suitable apparatus with air pressure for enclosing the upper side of the thermoplastic sheet.

The cloths and fabrics contemplated by the invention comprise any type of strands, fibers or yarns which are interlaced or interwoven in a manner to provide stretchability and to permit folding of the fabric or cloth without damage. The heating of the plastic sheet portion 19 is coordinated in time and intensity with the drawing operation of the article-forming portions of the sheet and the fabric to achieve desired rates of production.

What is claimed is:

1. A process of forming articles to a predetermined shape from a stretchable cloth and a thermoplastic sheet comprising the steps of positioning portions of the cloth and the sheet in generally coextending planes and spaced superimposed relationship over the shaping surface of a mold and a cavity adjacent said surface with the cloth between said surface and said sheet; supporting the periphery of the cloth portion overlying said cavity between opposed surfaces at a predetermined clearance to enable the cloth to slip in a controlled manner through said clearance; heating the sheet to a pliable tacky condition; providing sealed relationship of the periphery of said sheet portion to establish a closed chamber including said cavity, said cloth portion, and the spaced between said portions; forcing the sheet portion into engagement with the cloth portion and thence into conformation with the molding surface as the cloth undergoes slipping through said clearance and stretching to fix the sheet in adherent relation with the cloth by changing the atmospheric pressure at opposite sides of said sheet portion to establish a lower pressure in said chamber; and cooling the resulting composite product into a relatively rigid self-supporting condition.

UNITED STATES PATENT OFFICE
CERTIFICATE OF CORRECTION

Patent No. 3,616,013     Dated October 26, 1971

Inventor(s) Luigi Bocchi

It is certified that error appears in the above-identified patent and that said Letters Patent are hereby corrected as shown below:

On the cover sheet insert -- [73] Assignee: S.R.M.P., S.p.A., Milan, Italy --.

Signed and sealed this 12th day of September 1972.

(SEAL)
Attest:

EDWARD M. FLETCHER, JR.                ROBERT GOTTSCHALK
Attesting Officer                      Commissioner of Patents